June 19, 1956
O. E. MILLER
2,751,347
LIQUID CONDITIONING APPARATUS
Filed Jan. 29, 1954
3 Sheets-Sheet 2
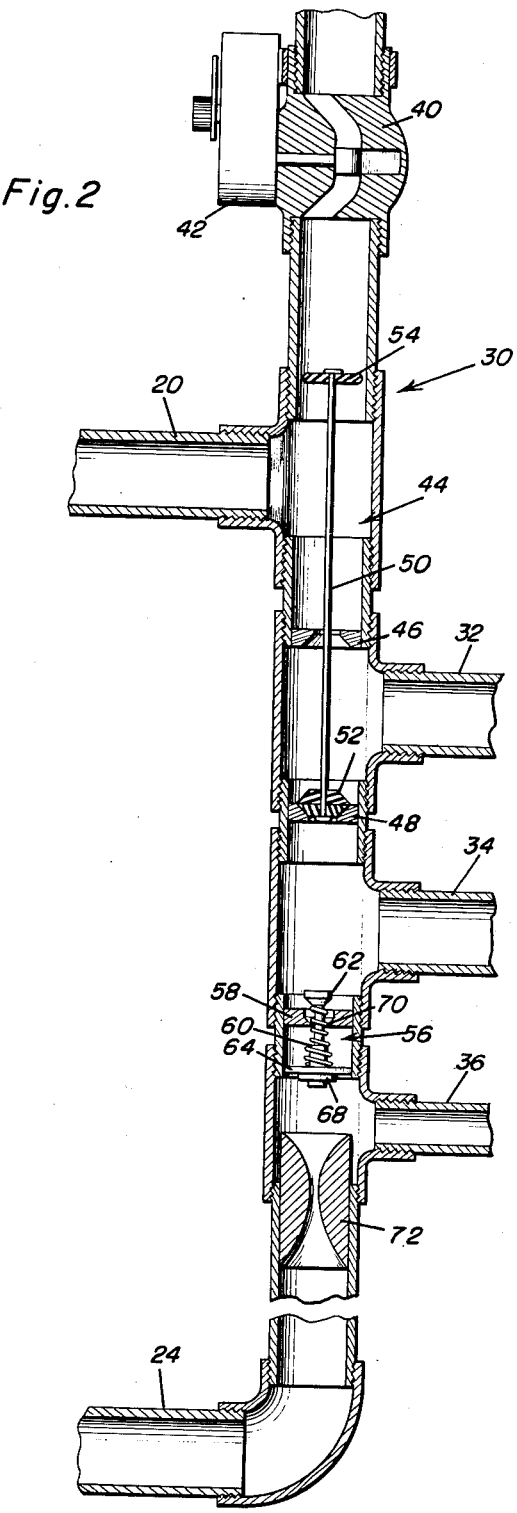
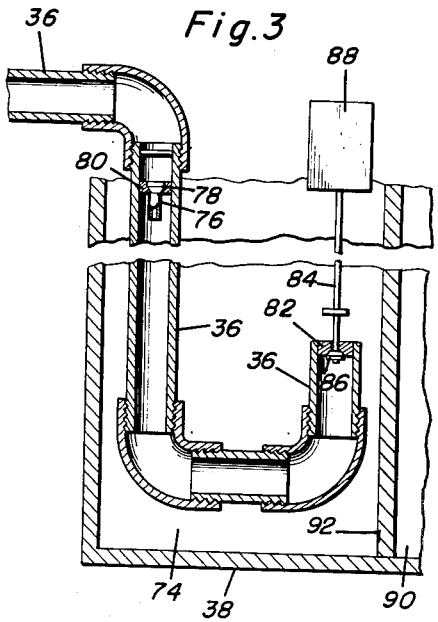
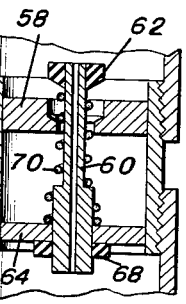
Omer E. Miller
INVENTOR.
BY *Clarence A. O'Brien*
*and Harvey B. Jacobson*
Attorneys June 19, 1956

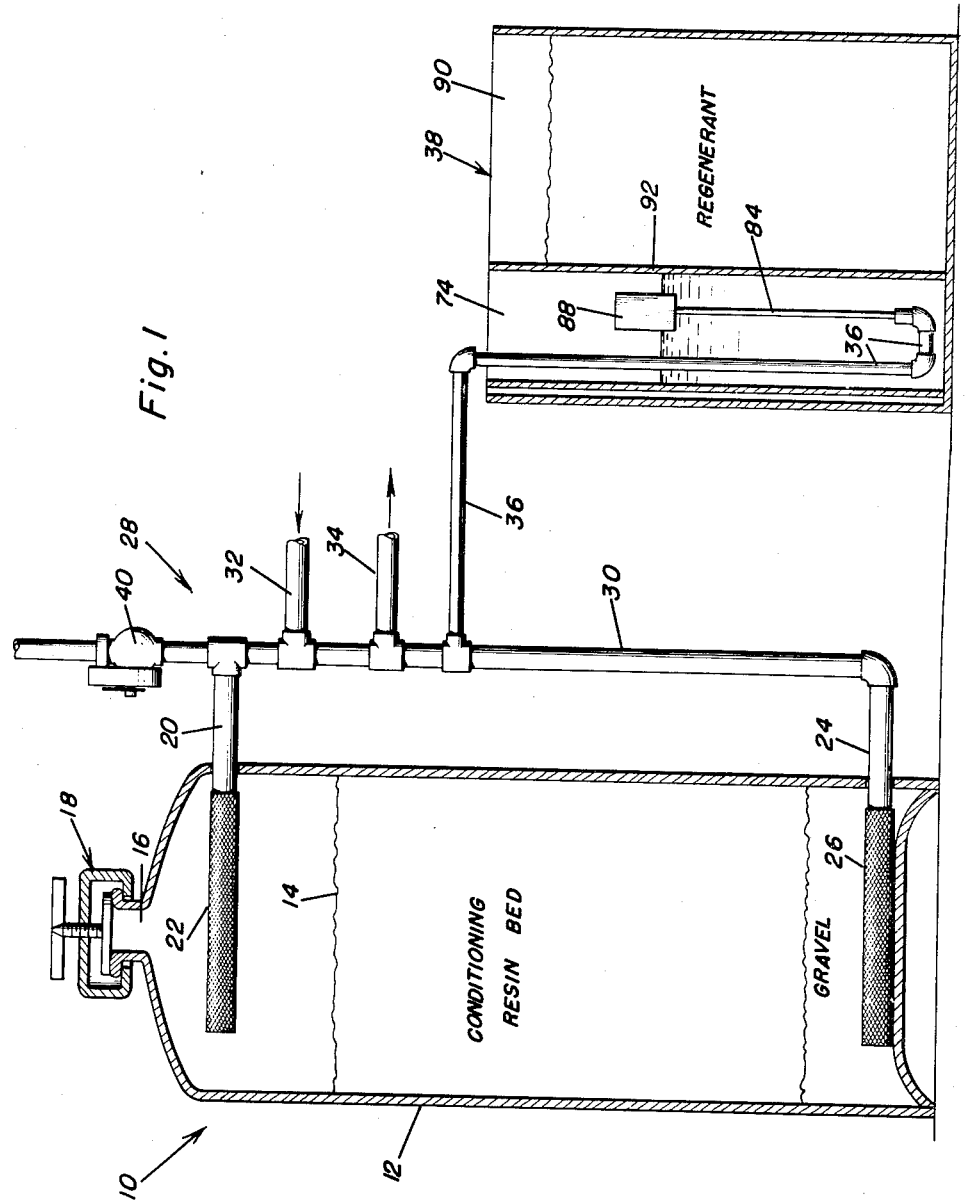

O. E. MILLER 2,751,347

LIQUID CONDITIONING APPARATUS

Filed Jan. 29, 1954

Omer E. Miller
INVENTOR.

BY Clarence A. O'Brien
and Harvey B. Jacobson
Attorneys

United States Patent Office 2,751,347
Patented June 19, 1956

2,751,347

LIQUID CONDITIONING APPARATUS

Omer E. Miller, South Plainfield, N. J.

Application January 29, 1954, Serial No. 406,911

6 Claims. (Cl. 210—24)

The present invention relates to fluid-treating apparatus, and flow-control means therefor, and more particularly relates to apparatus for conditioning liquids such as water softeners and the like.

The primary object of the invention is to provide a liquid conditioning apparatus through which liquid can be circulated normally to supply conditioned liquid to an outlet for the apparatus and wherein reverse flow through the apparatus can be accomplished simply by the opening of the drain valve whereby a treating brine or other fluid solution may be introduced into the system for reverse flow through the conditioning bed or resin for regenerating this resin while permitting the extraction of unconditioned liquid from the system for use during regeneration thereof.

Basically, the present invention consists of a fluid flow system for regenerating water softening beds and other liquid conditioning beds which system includes a main conduit disposed adjacent the conditioning bed communicating with inlet and withdrawal means at the top and bottom of the bed, this main conduit having longitudinally spaced therealong in the respective order named, liquid supply and outlet conduits and a regenerating fluid conduit. A drain valve is provided in the main conduit adjacent the liquid inlet means of the conduit and remote from all of the other conduits. A double-acting valve means is provided in the main conduit on opposite sides of the liquid supply conduit which operates when the drain valve is closed to cause fluid flow from the supply conduit through the main conduit and the inlet means for conditioning bed then down through the conditioning bed and up through the main conduit and out through the outlet conduit. When the drain valve is opened, the double-acting valve means moves in response to the change in direction of fluid flow to close direct entrance from the fluid supply conduit to the inlet means for the conditioning bed thereby reversing the flow through the main conduit down past the outlet and fluid regenerating conduit opening into the withdrawal means of the main conduit and thence upwardly through the conditioning bed to regenerate the same, out through the inlet means and to a drainage system connected with the drain valve.

The system is likewise provided in the main conduit thereof with means for creating a vacuum around the regenerating fluid inlet conduit into the main conduit so that regenerating fluid will be drawn into the carrier liquid in the regeneration cycle and passed upwardly through the conditioning bed. This vacuum creating means including means whereby unconditioned liquid may be withdrawn from the liquid outlet conduit during the regeneration of the system while yet maintaining the vacuum adjacent the regenerating fluid inlet conduit without interruption of the regeneration cycle and without contaminating the unconditioned liquid with the conditioning brine or other fluid as the unconditioned liquid is withdrawn through the outlet conduit.

An extremely important object of the invention, ancillary to the primary object, is the provision of a novel valve arrangement whereby the liquid itself controls the positioning of the valve through the opening of the drain valve for effecting a reversal of flow through the apparatus for a predetermined time interval whereupon flow will automatically reverse in its normal direction.

Another object of the invention is to provide a valve means which operates in the manner described in the preceding object which may be actuated within a closed system, necessitating no external or auxiliary means of actuation other than the fluid flow within the system or gravity.

A further object of the invention is to provide a means for introducing a conditioning brine into the system during the reverse flow through the system, which introduction is likewise controlled by the movement of the fluids themselves within the system and which includes an ejecting assembly introducing a treating solution into the system.

Another object of the invention, ancillary to the preceding object, is the provision of an ejecting assembly which includes a valve arrangement which permits full flow of liquid in one direction but upon reversal in the direction of flow creates a restricted flow whereby a partial vacuum is created, drawing the treating solution into the fluid flow during the reverse movement through the conditioning bed automatically during the reversal cycle of the liquid through the bed.

A still further object of the invention is to provide a flow-control device for a fluid-conditioning system wherein flow-reversing means are included which are directly responsive to the flow of fluid through a drain line from said system whereby reversal of the flow through the system may be accomplished by the opening of a drain valve in the drain line and is independent of pressure differentials within the system.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a side elevational view of a liquid conditioning apparatus with parts of the apparatus being shown in cross-section for clarity of details;

Figure 2 is an enlarged side elevational view of the means for creating reverse flow through the system taken in cross-section to disclose the operating parts of the system;

Figure 3 is a cross-sectional view of the means for supplying the liquid conditioning bed regenerating fluid to the system;

Figure 4 is an enlarged detail of one of the valves of the system;

Figure 5:
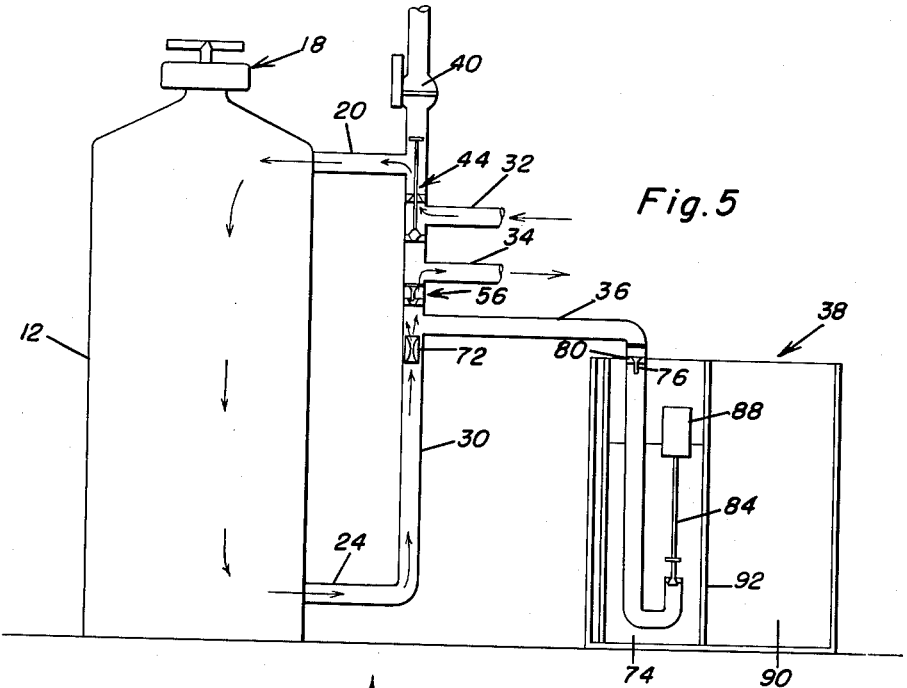
Figure 5 is a schematic view of the apparatus disclosing the normal liquid flow through the apparatus.
Figure 6:
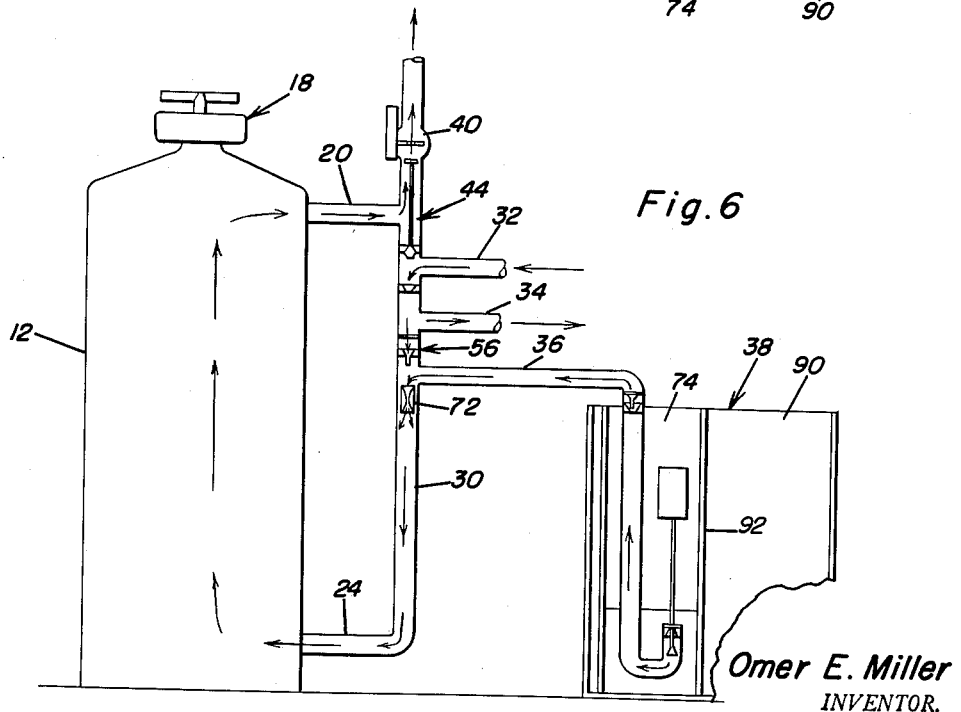
Figure 6 is a schematic view of the apparatus disclosing the reverse flow of liquid and regenerating fluid through the apparatus.

Since apparatus such as that of the present nature are primarily used as water softening systems, the present apparatus will be described with relation to its use as a water softening apparatus. However, it is to be understood that the invention is not so limited but may be utilized in any suitable liquid treatment or purification arrangement.

Referring first to Figure 1 of the drawings, the liquid conditioning or water softening apparatus is designated in its entirety by the numeral 10 and is seen to consist essentially of a water softening tank 12 having a conventional water softening bed 14 therein which may consist of a gravel base and a suitable resinous upper layer. The tank is provided at its upper end with an opening 16 for the reception of the bed into the tank, which opening is normally closed with a suitable closure arrangement 18. Adjacent the top of the tank, the tank is provided with liquid inlet means in the form of a conduit 20 which opens into the tank above the bed 14 and is provided with a suitable screen 22 at the end opening into the tank. At the bottom of the bed 14, the tank is provided with a liquid withdrawal means in the form of a conduit 24 having a screen 26 at the mouth thereof within the tank.

Disposed at one side of the tank is the regeneration system 28 constituting the present invention.

This regeneration system 28 consists primarily of a vertically disposed main conduit 30 having an outlet opening in an upper portion thereof communicating with the liquid inlet conduit 20 and having a return opening at its lower end communicating with the liquid withdrawal conduit 24. Opening into the main conduit 30 at vertically downwardly spaced points therealong are a supply opening communicating with liquid supply conduit 32, a service opening communicating with service or liquid outlet conduit 34, and a regenerating fluid inlet opening communicating with regenerating fluid conduit 36. In this connection, the more generic term "fluid" utilized in describing the conduit 36 is primarily for ease of distinction among the conduits. Regenerating fluid conduit 36 opens at its other end into a compartmented regenerating fluid supply reservoir 38. On the main conduit 30 above the liquid inlet means 20 a drain valve 40 is provided.

Noting Figure 2 of the drawings, the internal arrangement within the main conduit 30 will be most readily observed. The drain valve 40 is provided with a timing mechanism 42 which is set to open and close this drain valve at predetermined intervals.

Beneath the drain valve within the conduit 30 is a double acting valve means 44 which consists of a pair of upper and lower valve seats 46 and 48, respectively, disposed on opposite sides of the liquid supply conduit 32 opening into the main conduit 30. Longitudinally disposed rod 50, disposed within the main conduit 30, is provided with a double headed piston 52 at its lower end reciprocably disposed between the upper and lower valve seats 48. At the upper end, the rod 50 is provided with a disk 54 of a considerably smaller diameter than the internal diameter of the main conduit 30 and disposed above the liquid inlet conduit 20.

Between the liquid outlet or service conduit 34 and the regenerating fluid conduit 36 is a one-way restriction valve 56 which consists of a valve seat 58 having a tube 60 reciprocably disposed therein, the upper end of the tube being cup-shaped as at 62, and enlarged to seat on the seat 58. The lower portion of the tube extends slidably through a suitable mounting spider or the like 64 and a gasket or washer 68 is secured to the lower end portion of the tube to limit the upward movement of the tube through the spider 64. Coil spring 70 reacts between the cup-shaped valve member 62 and the mounting bracket or spider 64 to urge the tube upwardly out of seating engagement with the seat 58.

Below the regenerating fluid conduit 36 in the main conduit 30 a venturi constriction 72 is provided.

Turning now to Figure 3, it will be seen that the other end of the fluid conduit 36 opens into the first compartment 74 of the regenerating fluid reservoir 38. Within a portion of the conduit 36 disposed within the compartment 74 is a tubular valve member 76 having an enlarged cup-shaped upper end 78 seating on the valve seat 80 within the conduit. At the end of the conduit 36 opening into the compartment 74 a second valve seat 82 is formed and plunger rod 84 extends reciprocably through the valve seat 82 and is provided at its lower end with a valve member 86. At its upper end, the plunger rod 84 is provided with a float 88 which, during the normal operation of the apparatus, draws the valve member 86 into seating engagement with the valve seat 82, thus closing this outer end of the conduit 36.

The second compartment 90 of the reservoir 38 constitutes a storage chamber for the regenerating fluid. Hollow tile 92, separating the compartments, simply rests on the bottom of the reservoir permitting free flow of liquid between the compartments.

In the normal operation of the apparatus, the drain valve 40 is closed. Liquid enters the system through the liquid supply conduit 32. Through gravity, the double acting valve 44 will be closed causing the liquid flow to travel upwardly from the liquid supply conduit 32 through the main conduit 30 and thence through the liquid inlet conduit 20 into the water softening tank 12 from whence it will filter down through the filtering bed 14. During this operation, there is a pressure drop as the liquid goes through the conditioning resin of the bed 14, which pressure drop will be communicated to the lower side of the double acting valve so that this valve will retain its seat as the liquid travels through the liquid withdrawal conduit 24 through the return opening in main conduit 30 and thence through the liquid outlet or service conduit 34. Since the pressure on the underside of the double acting valve is always equal to or less than the pressure on the upper side of this valve, the valve will remain seated on the lower seat 48. As the liquid passes upwardly through the main conduit 30 from the conduit 24, it goes through the venturi 72 and unseats the restricting valve 56 from its seat to provide substantially full flow through the outlet conduit 34. At the same time, this liquid will enter the regenerating fluid conduit 36 but will be prevented from entering the compartment 74 of the regenerating fluid storage reservoir by virtue of its pressure against the float assembly 84, 86, 88.

When the timing mechanism on the drain valve opens this valve, liquid immediately begins to flow through the drain line from that portion of the main conduit 30 above the liquid inlet 20. This creates a static condition within the apparatus and the pressure is equalized on both sides of the valve seats 46 and 48, so that no pressure is holding the double acting valve 44 closed. Thus, the water flow rising through the drain line presses upwardly on the disk 54 moving the piston rod 50 upwardly and causing the piston 52 to seat against the upper valve seat 46. Once the piston 52 assumes this position, it is held seated against the upper valve seat by water pressure, since simultaneously the pressure from the conditioning tank or water softening tank is relieved. Hence, the top side above the upper valve seat 46 is of substantially no pressure with the now normal pressure of the system being still retained at the liquid outlet conduit by virtue of the primary jet stream of liquid passing through valve seat 48 if it is desired to use liquid from the system during the regeneration thereof.

Further, the restriction valve or sequence valve 56 seeks its seat by virtue of the downward primary jet stream flow of the water or other liquid thereon flowing now downwardly through the conduit 30 from the liquid supply conduit 32 and a fine secondary jet stream of liquid goes through its central bore directed unobstructedly through the center of the Venturi 72. This creates a low pressure area at this point which causes the flow of regenerant from the compartment 74 of the storage tank since the water pressure from the float valve is now relieved. This partial vacuum created within the regenerant fluid line 36 causes the regenerating fluid to flow into the Venturi and down with the liquid into the liquid withdrawal conduit 24 and thence upwardly through the conditioning bed 14, outwardly into the main conduit 30 through the liquid inlet conduit 20 and thence out through the drain valve 40.

The regenerating fluid continues to flow from the storage tank until depleted. Of course, when depleted, only air will be taken in through the main conduit 30 through the line 36 and liquid continues its reverse flow through the conditioning bed until a predetermined time set by the timing mechanism on the drain valve when the drain valve is closed, the regenerating fluid having been rinsed from the conditioning bed.

Now liquid can no longer go out the drain line and it will start to flow into the compartment 74 of the fluid regenerating reservoir, seating the valve 76 in its seat 80 and thus restricting somewhat the flow of fluid into this compartment to avoid too rapid filling of the compartment. As the compartment continues to fill, and the level approaches that of the float 88 in its closed position, the float 88 will be raised seating the valve 86 on its seat 82 and closing further ingress of water or liquid into the compartment 74. When this occurs, the pressure within the system is equalized and the double acting valve means 44 will fall by gravity to the lower valve seat 48 and the apparatus will once again resume its normal operation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is as follows:

1. In a fluid-treating apparatus, the combination comprising a container having a treating bed therein and fluid-inlet and -outlet means communicating with said container, means for alternatly causing flow of said fluid and flow of a regenerating fluid through said bed, said means including a main conduit disposed adjacent said container and having outlet and return openings communicating with said fluid-inlet and -outlet means, said main conduit having supply and service openings and an inlet opening for regenerating fluid in longitudinally-spaced relation between said outlet and return openings; drain valve means in said main conduit above said outlet opening; double-acting valve means in said main conduit, said double-acting valve means comprising upper and lower spaced seats at opposite sides of said supply opening, and a valve element movable to upper and lower positions to alternately position on said seats; fluid-flow-responsive means in said main conduit between said outlet opening and said drain valve means; means connecting said fluid-flow-responsive means and said valve element so that actuation of said fluid-flow-responsive means causes said valve element to position on said upper seat; and ejector means in said main conduit below said double-acting valve adapted to draw regenerating fluid into said main conduit through said inlet opening upon reversal of flow in said conduit due to the positioning of said valve element on said upper seat.

2. A flow-control device for fluid-conditioning apparatus, comprising: a main conduit having a supply opening for introduction of a supply of fluid to be conditioned, said main conduit having on one side of said supply opening an outlet opening for flow of fluid from said main conduit to said conditioning apparatus and for reverse flow of fluid from said conditioning apparatus to drain, and a valve-controlled drain opening spaced from said outlet opening, said main conduit having on the other side of said supply opening a service opening for delivering fluid from said main conduit to a service line, an inlet opening for supplying regenerating fluid to said main conduit, and a return opening for the flow of conditioned fluid from said conditioning apparatus to said service opening and for the flow of regenerating fluid to said conditioning apparatus in a reverse direction depending upon the position of said drain valve; a double-acting valve in said main conduit including a pair of valve seats defining opposed ports on opposite sides of said supply opening, a valve element reciprocably movable between said valve seats to alternately close said opposed ports and thereby control the direction of fluid flow from said supply opening through said main conduit, said valve element normally being urged to a position closing the port on the side of said supply opening in the direction of said service opening to thereby direct fluid through said outlet opening to said conditioning apparatus, the other of said valve ports being normally open; a fluid-flow-responsive element in said main conduit between said outlet opening and said valve-controlled drain opening, said fluid-flow-responsive element being movable in response to flow of fluid through said drain opening in the direction of such fluid flow; means connecting said fluid-flow-responsive element to said valve element whereby flow of fluid through said drain opening closes said normally open valve port to effect reversal of direction of fluid flow through said main conduit; and ejector means in said conduit adapted to draw regenerating fluid into said main conduit through said inlet opening upon said reversal of fluid flow in said main conduit.

3. The flow-control device defined in claim 2 wherein said fluid-flow-responsive means comprises a disk and said means connecting said fluid-flow-responsive means to said valve element comprises a rod extending through one of said valve ports.

4. A flow-control device for fluid-conditioning apparatus, comprising: a main conduit having a supply opening for introduction of a supply of fluid to be conditioned, said main conduit having on one side of said supply opening an outlet opening for flow of fluid from said main conduit to said conditioning apparatus and for reverse flow of fluid from said conditioning apparatus to drain, and a valve-controlled drain opening spaced from said outlet opening, said main conduit having on the other side of said supply opening a service opening for delivering fluid from said main conduit to a service line, an inlet opening for supplying regenerating fluid to said main conduit, and a return opening for the flow of conditioned fluid from said conditioning apparatus to said service opening and for the flow of regenerating fluid to said conditioning apparatus in a reverse direction depending upon the position of said drain valve; a double-acting valve in said main conduit including an upper and lower valve seat defining an upper and lower port on opposite sides of said supply opening, a valve element reciprocably movable between said valve seats to alternately close said ports and thereby control the direction of flow from said supply opening through said main conduit, said valve element normally being urged to a position closing the lower port to thereby direct fluid from said supply opening through said outlet opening to said conditioning apparatus; a fluid-flow-responsive element in said main conduit between said outlet opening and said valve-controlled drain opening, said fluid-flow-responsive element being movable in response to flow of fluid through said drain opening in the direction of said fluid flow; means conecting said fluid-flow-responsive element to said valve element whereby flow of fluid through said drain opening closes said upper valve port to effect reversal of direction of fluid flow through said main conduit; and ejector means in said main conduit comprising means defining a fixed restriction below said regenerating fluid inlet opening, and a movable valve member positioned in said main conduit between said regenerating fluid inlet opening and said service opening, said movable valve member having a central opening axially aligned with said fixed restriction, said movable valve member being normally urged to a position permitting relatively unrestricted flow of fluid from said return opening to said service opening and being fluid-pressure-responsive to restrict flow in the reverse direction.

5. The combination as defined in claim 4 wherein said movable valve member is spring-biased to a normally open position to permit relatively unrestricted flow past said valve member from said return openings to said service opening, and wherein said lower valve port is axially aligned with the central opening of said movable valve member.

6. A flow-control device for fluid-conditioning apparatus, comprising: a main conduit having a supply opening for introduction of a supply of fluid to be conditioned, said main conduit having on one side of said supply opening an outlet opening for flow of fluid from said main conduit to said conditioning apparatus and for reverse flow of fluid from said conditioning apparatus to drain, and a valve-controlled drain opening spaced from said outlet opening, said main conduit having on the other side of said supply opening a service opening for delivering fluid from said main conduit to a service line, a regenerating fluid inlet opening for supplying regenerating fluid to said main conduit, and a return opening for the flow of conditioned fluid from said conditioning apparatus to said service opening and for the flow of regenerating fluid to said conditioning apparatus in a reverse direction depending upon the position of said drain valve; a double-acting valve in said main conduit including an upper and lower valve seat defining an upper and lower port on opposite sides of said supply opening, a valve element reciprocably movable between said valve seats to alternately close said ports and thereby control the direction of flow from said supply opening through said main conduit, said valve element normally being urged to a position closing the lower port to thereby direct fluid from said supply opening through said outlet opening to said conditioning apparatus; and ejector means in said conduit adapted to draw regenerating fluid into said main conduit through said inlet opening upon reversal of flow in said main conduit, said ejector means comprising a Venturi member below said regenerating fluid inlet opening, a movable valve member, means mounting said movable valve member in said main conduit above said regenerating fluid inlet opening and below said service opening, said movable valve member having a central opening axially aligned with the throat of said Venturi member and with the lower port of said double-acting valve, resilient means cushioning the movement of said movable valve member and urging said movable valve member to a normally open position to permit relatively unrestricted flow past said valve member from said return opening to said service opening, said movable valve member being fluid-pressure-responsive to close upon the opening of the lower port of said double-acting valve and providing a jet stream through said central opening into the throat of said Venturi member.

References Cited in the file of this patent

UNITED STATES PATENTS

| | | |
|---|---|---|
| 1,918,225 | Dotterweich | July 11, 1933 |
| 1,949,044 | Dotterweich | Feb. 27, 1934 |
| 1,976,439 | Dotterweich | Oct. 9, 1934 |
| 2,396,809 | Addison | Mar. 19, 1946 |
| 2,539,748 | Mueller | Jan. 30, 1951 |
| 2,545,425 | Fischer | Mar. 13, 1951 |
| 2,556,872 | Deters | June 12, 1951 |
| 2,558,471 | Whitlock | June 26, 1951 |
| 2,670,328 | Webb | Feb. 23, 1954 |
| 2,715,098 | Whitlock | Aug. 9, 1955 |